United States Patent
Snow et al.

(10) Patent No.: US 6,185,550 B1
(45) Date of Patent: *Feb. 6, 2001

(54) METHOD AND APPARATUS FOR CLASSIFYING DOCUMENTS WITHIN A CLASS HIERARCHY CREATING TERM VECTOR, TERM FILE AND RELEVANCE RANKING

(75) Inventors: William A. Snow, Redwood City; Joseph D. Mocker, Cupertino, both of CA (US)

(73) Assignee: Sun Microsystems, Inc., Palo Alto, CA (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

This patent is subject to a terminal disclaimer.

(21) Appl. No.: 08/874,783

(22) Filed: Jun. 13, 1997

(51) Int. Cl.⁷ ....................................... G06F 17/30
(52) U.S. Cl. ................ 707/1; 707/3; 707/5; 707/100; 707/102; 707/514; 707/907
(58) Field of Search ................ 707/1–10, 100–104, 707/500, 514, 532, 512, 533, 536, 501, 515, 200–206, 907; 1/1; 345/440; 358/462, 403; 395/701; 704/4–10

(56) References Cited

U.S. PATENT DOCUMENTS

| | | | |
|---|---|---|---|
| 5,162,992 | * 11/1992 | Williams | 707/2 |
| 5,255,104 | * 10/1993 | Kajigaya | 358/403 |
| 5,297,249 | 3/1994 | Bernstein et al. | 345/356 |
| 5,301,319 | 4/1994 | Thruman et al. | 707/103 |
| 5,317,646 | 5/1994 | Sang et al. | 382/175 |
| 5,333,237 | 7/1994 | Stefanopoulos et al. | 706/11 |
| 5,355,472 | 10/1994 | Lewis | 707/101 |
| 5,418,946 | * 5/1995 | Mori | 707/1 |
| 5,442,778 | 8/1995 | Pedersen et al. | 707/5 |
| 5,463,773 | * 10/1995 | Sakakibara et al. | 707/102 |
| 5,500,920 | 3/1996 | Kupiec | 704/270 |
| 5,519,608 | * 5/1996 | Kupiec | 704/9 |
| 5,568,640 | * 10/1996 | Nishiyama et al. | 707/1 |
| 5,634,051 | 5/1997 | Thomson | 707/5 |
| 5,649,186 | * 7/1997 | Ferguson | 707/10 |
| 5,706,496 | 1/1998 | Noguchi et al. | 707/3 |
| 5,721,910 | 2/1998 | Unger et al. | 707/100 |
| 5,761,497 | * 7/1998 | Holt et al. | 707/5 |
| 5,768,578 | 6/1998 | Kirk et al. | 707/100 |
| 5,778,362 | * 7/1998 | Deerwester | 707/5 |
| 5,778,372 | 7/1998 | Cordell et al. | 707/100 |
| 5,781,914 | 7/1998 | Stork et al. | 707/506 |
| 5,787,425 | 7/1998 | Bigus | 707/6 |
| 5,802,518 | 9/1998 | Karaev et al. | 707/9 |
| 5,806,068 | 9/1998 | Shaw et al. | 707/103 |
| 5,809,340 | 9/1998 | Bertone et al. | 710/58 |
| 5,812,995 | 9/1998 | Sasaki et al. | 707/1 |
| 5,813,014 | 9/1998 | Gustman | 707/103 |
| 5,835,712 | 11/1998 | DuFresne | 709/203 |
| 5,838,965 | 11/1998 | Kavanaugh et al. | 707/103 |
| 5,862,325 | 1/1999 | Reed et al. | 709/201 |
| 6,055,540 | * 4/2000 | Snow et al. | 707/103 |

FOREIGN PATENT DOCUMENTS

0704810A1 * 4/1996 (EP) ........................................ 17/30

* cited by examiner

*Primary Examiner*—John Breene
*Assistant Examiner*—Srirama Channavajjala
(74) *Attorney, Agent, or Firm*—D'Alessandro & Ritchie

(57) ABSTRACT

A method for classifying a document based on content within a class hierarchy. The class hierarchy comprises a plurality of category nodes stored within a tree data structure. Each of the plurality of category nodes includes a category name corresponding to a unique directory and a category definition comprising a set of defining terms. The class hierarchy is searched to determine appropriate categories for classification of the document. The document is then stored in directories corresponding to the categories selected for classification. If no categories are produced by the search, a system administrator is notified of the unsuccessful search.

75 Claims, 6 Drawing Sheets

METHOD AND APPARATUS FOR CLASSIFYING DOCUMENTS WITHIN A CLASS HIERARCHY CREATING TERM VECTOR, TERM FILE AND RELEVANCE RANKING

BACKGROUND OF THE INVENTION

1. Field of the Invention

The embodiments of the present invention relate to a method and apparatus for classification of documents within defined categories using a class hierarchy having document categories and corresponding category definitions. More particularly, the embodiments of the present invention relate to a method and apparatus for comparing a document to be classified to the category definitions to determine appropriate category classification for the document and classifying the document within the appropriate category or categories.

2. Background of the Invention

Libraries and other institutions have historically categorized documents by hand. Furthermore, information retrieval systems exist which provide documents for automated retrieval. For example, Yahoo!®, an information storage and retrieval system available to Internet users at http://www.yahoo.com, allows a user to search for information according to various search terms.

Yahoo!® allows a user to classify a document within various categories. However, Yahoo!® requires a user to determine appropriate classification for each document prior to classifying the document. In today's computerized society, it would be extremely beneficial to provide a means for automating this process of document categorization. A need exists in the prior art for an automated document classification system for categorizing a document based upon the content of the document.

BRIEF DESCRIPTION OF THE INVENTION

A method and apparatus for classification of documents based on content within a class hierarchy is provided. The class hierarchy comprises a plurality of category nodes stored within a tree data structure. Each of the plurality of category nodes includes a category name corresponding to a unique directly and a category definition comprising a set of defining terms. In accordance with the invention, the class hierarchy is searched to determine appropriate categories for classification of the document. The document is stored in directories corresponding to the categories selected for classification. If no categories are produced by the search, a system administrator is notified of the unsuccessful search.

BRIEF DESCRIPTION OF THE DRAWINGS

The following figures are illustrative and not intended to limit the scope of the invention.

DETAILED DESCRIPTION OF THE EMBODIMENTS OF THE INVENTION

Those of ordinary skill in the art will realize that the following description of the embodiments of the present invention is illustrative only and is not intended to be in any way limiting. Other embodiments of the invention will readily suggest themselves to such skilled persons from an examination of the within disclosure.

The embodiments of the present invention provide for automatic document classification within user-defined categories. A user can then interactively search for documents according to search terms within the user-defined categories. Documents are ranked according to relevance, and a user specified number of documents which are most relevant are returned. According to one embodiment, the present invention is made available to multiple users via a network.

While the embodiments of the present invention are of broad applicability and can be used in a variety of contexts, one embodiment is designed specifically to interface with Fulcrum, an information retrieval system designed for use by application developers. Fulcrum is available from Fulcrum Technologies, Inc., located at 785 Carling Ave, Ottawa, Canada K1S5H4, (613) 238-1761. The functions provided by Fulcrum include text search, indexing and retrieval capabilities. Indexing creates a summary of all documents within a desired directory and subdirectories. When a directory is indexed, Fulcrum creates an index comprising a document vector for each document within the selected directory. To create each document vector, each document is split into terms and a weight is associated with each of the terms. The term weights are based upon frequency of occurrence of each term within the document. The weights, therefore, are higher when a term exists multiple instances within the document.

Method for Creating a Class Hierarchy

Figure 1:
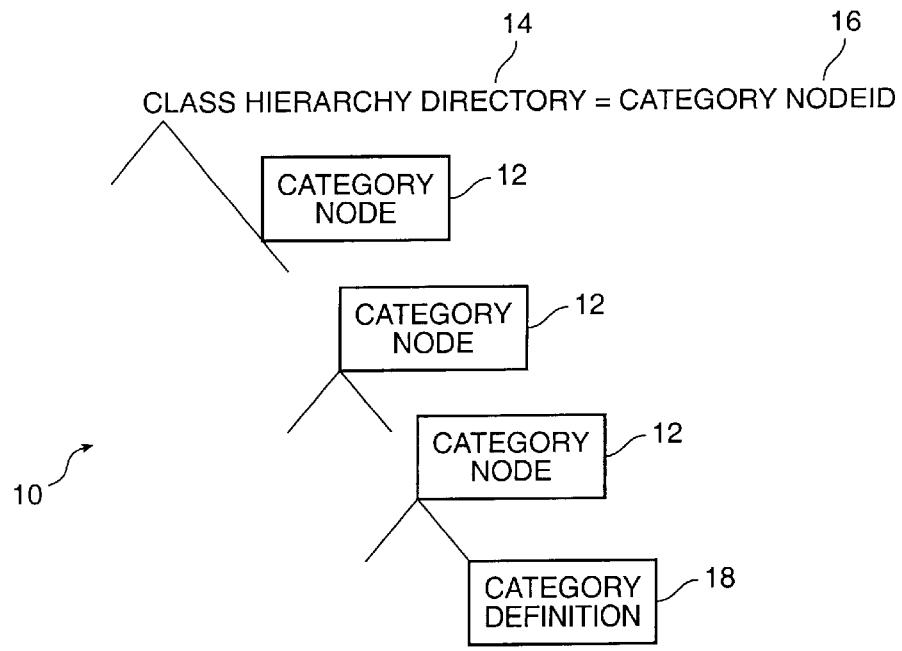
FIG. 1 illustrates a class hierarchy according to one embodiment of the present invention.

Referring now to FIG. 1, a class hierarchy 10 according to one embodiment of the present invention is shown. The class hierarchy 10 comprises at least one level of categories. These categories may further comprise sub-categories. The categories are stored in category nodes 12 within a tree data structure. According to one embodiment of the present invention, each of the category nodes 12 corresponds to a class hierarchy directory 14 equivalent to a category NodeID 16. Each category not further comprising sub-categories will herein be referred to as a leaf node, or leaf category. Each leaf category comprises a category definition 18 defining the leaf category. According to an embodiment of the present invention, the category definition 18 comprises two groups of data. The first group of data contains descriptive terms defining the corresponding leaf category. The second group of data contains portions of documents which have been classified by a user as being relevant to the leaf category. Each category further comprising subcategories is defined by the terms corresponding to all subcategories within the category. The class hierarchy 10 is stored in a class hierarchy database.

According to one embodiment of the present invention, the category node 12 includes the following fields:

Category name—The category name is used for display purposes.

Nodetype—There are three possible node types: normal, "see" and "see also". "See also" indicates that a category/node can be added at this level, but lists alternate locations in which it may also be placed. "See" indicates that a category/node cannot be added at this level, and gives alternate categories in which to place the new category. "Normal" indicates that the node is either a branch or a leaf node. The node type is set at time of creation of the node.

NodeID—When a node is created, an integer NodeID is associated with the node. According to an embodiment of the present invention, each directory within the class hierarchy comprises a directory name equivalent to the NodeID of the corresponding category. The NodeID is used rather than the category name, since each category name may contain characters that would result in an invalid directory name.

ParentID—The ParentID field contains an integer indicating the NodeID of the parent node.

LinkID—The LinkID field is used for "see" and "see also" node types. The LinkID contains an integer indicating a NodeID of a desired reference node.

Entered by—The entered by field comprises a user ID entered by the user. This field provides a means for tracking system updates and creation of system errors.

One of ordinary skill in the art will recognize that the category node may comprise fewer or additional fields.

Figure 2:
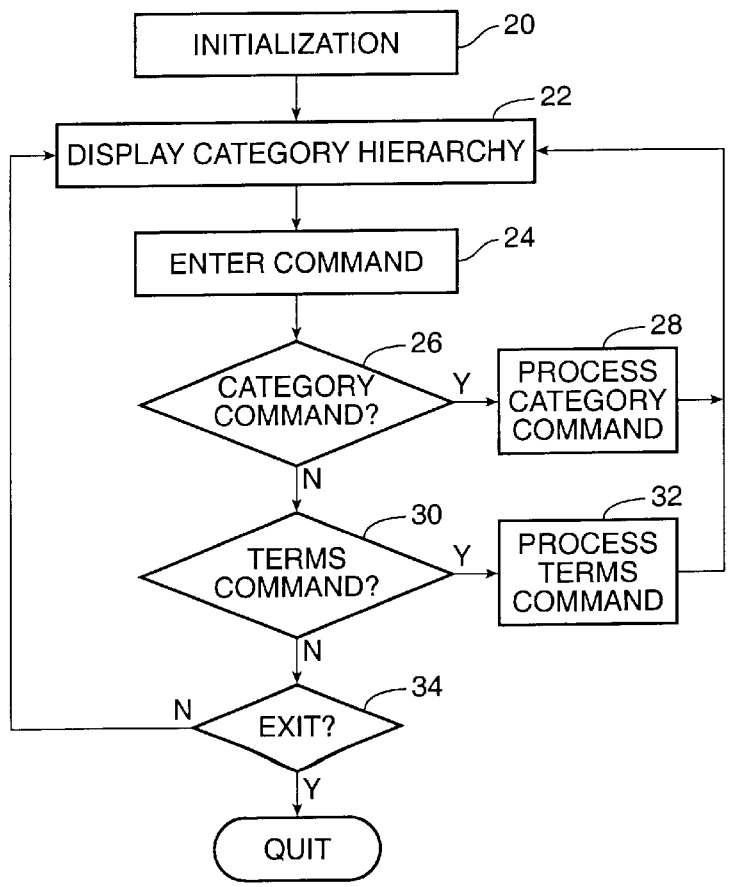
FIG. 2 is a flow diagram of the main program loop utilized in creation of the class hierarchy according to an embodiment of the present invention.

Referring now to FIG. 2, a flow diagram of the main program loop utilized in creation of the class hierarchy according to one embodiment of the present invention is shown. At step 20, initialization of the class hierarchy is performed. Initially, the class hierarchy comprises a root category, or root node. In addition, an initial set of descriptive terms, including document portions, are provided to a user. The set of initial terms and document portions are generated from various sources (i.e., keyword tables, search log files).

The class hierarchy is displayed at step 22. To display the updated class hierarchy, the class hierarchy is traversed. First, the root is found by finding the node having no parent. The NodeID of the root is then obtained. Second, it is determined whose parent is the NodeID of the root. The second step is iteratively performed with the NodeID of the current node until the LinkID indicated that the node contains no children. Since categories and terms cannot be added to a node unless a node contains only "see also" subnodes, this is indicated in the display. For example, if a node contains only "see also" subnodes, this node will be displayed to the user. However, if a node contains a subnode having a "normal" or "see" nodetype, the node will not be displayed or this limitation will otherwise be indicated to the user. Alternatively, the class hierarchy may be displayed at a later step.

Several category commands are available to create the class hierarchy. These commands include the capability to add a category node, link a first category node to a second category node, move a category node, delete a category node, edit a category node, or display information defining a category node. Manipulating nodes in a tree data structure is known in the art of software development.

At step 24, a user-selected command is entered. If the user-selected command is determined to be a category command at step 26, the appropriate category command is processed at step 28, and the routine returns to step 22. If it is determined that the user-selected command is not a category command at step 26, it is next determined whether the user-selected command is a terms command at step 30. If the user-selected command is a terms command, the appropriate terms command is processed at step 32, and the loop is repeated at step 22. The loop is repeated at step 22 until the user chooses to exit the main program loop at step 34. Alternatively, the steps 26–32 may ordered in various ways to achieve the same result.

Figure 3:
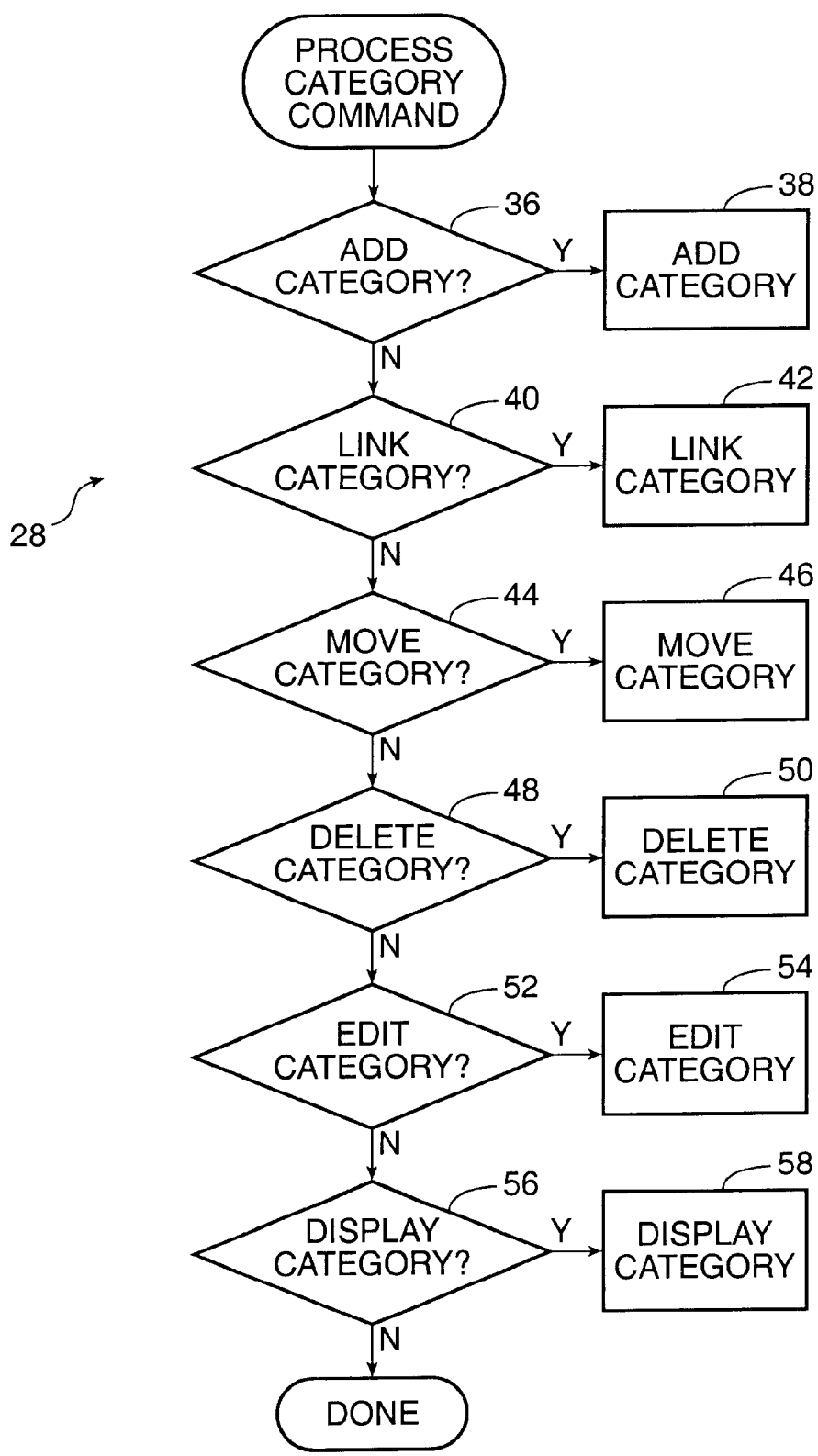
FIG. 3 is a flow diagram of the process category command procedure shown in the main program loop of FIG. 2 according to an embodiment of the present invention.

Referring now to FIG. 3, a flow diagram of the process category command procedure 28 shown in FIG. 2 according to an embodiment of the present invention is illustrated. If the user-selected command is determined to be an add category command at step 36, the add category command is performed at step 38. This command is used to add a new category by name, adding a child node to an existing category. Add is not available if the node is a leaf node or the node contains a "see" link. Add is available if a node contains only "see also" sub-nodes. The first category, or node, comprises a root directory, or 0 node. When a new category is added, a new category node is created containing a user-defined category name, a nodetype, a unique NodeID corresponding to the user-defined category name, a ParentID corresponding to a NodeID of a parent category node, a LinkID, and a UserID. This category node is then stored within the parent category node.

If the user-selected command is not an add category command, at step 40 it is determined if the user-selected command is a link category command. If the user-selected command is a link category command, the link category command is performed at step 42. The link category command allows a category to refer to another category using "see" or "see also". "See also" indicates that one or more other categories contain related information. "See" indicated that this category name cannot contain sub-categories. Link is not available at the root node. Furthermore, the link command is not available if a node already contains a "see" link.

If the user-selected command is not a link-category command, at step 44 it is determined if the user-selected command is a move category command. If the user-selected command is a move category command, the move category command is performed at step 46. The move category command allows a category to be moved to another location within the class hierarchy.

If the user-selected command is not a move-category command, at step 48 it is determined if the user-selected command is a delete category command. If the user-selected command is a delete category command, the delete category command is performed at step 50. The delete category command deletes a category and any subtree. This command is not available at the root level.

If the user-selected command is not a delete category command, at step 52 it is determined if the user-selected command is an edit category command. If the user-selected command is determined to be an edit category command, the edit category command is performed at step 54. The edit category command allows a category to be renamed.

If the user-selected command is not an edit category command, at step 56 it is determined if the user-selected command is a display category command. If the user-selected command is determined to be a display category command, the display category command is performed at step 58. This command displays node information corresponding to a particular category. According to one embodiment of the present invention, ParentID and LinkID information are not displayed. If the user-selected command is not a display category command, the process category command routine is completed and the program returns to the main loop of FIG. 2. One of ordinary skill in the art will recognize that steps 36–58 may performed in an alternate order.

According to an embodiment of the present invention, the category definition for each leaf category in the class hierarchy is stored in a terms database. The terms database comprises descriptive terms and portions of documents defining all leaf categories. Each of the descriptive terms include a reference corresponding to at least one leaf category. Similarly, each of the portions of documents include a reference corresponding to at least one leaf category, document name, type of document, fields, or portions, included within the document (i.e., synopsis), and indexing information indicating which fields, or portions, are to be extracted during indexing. Therefore, a category definition may be defined by different portions of documents depending upon the type of each document.

Figure 4:
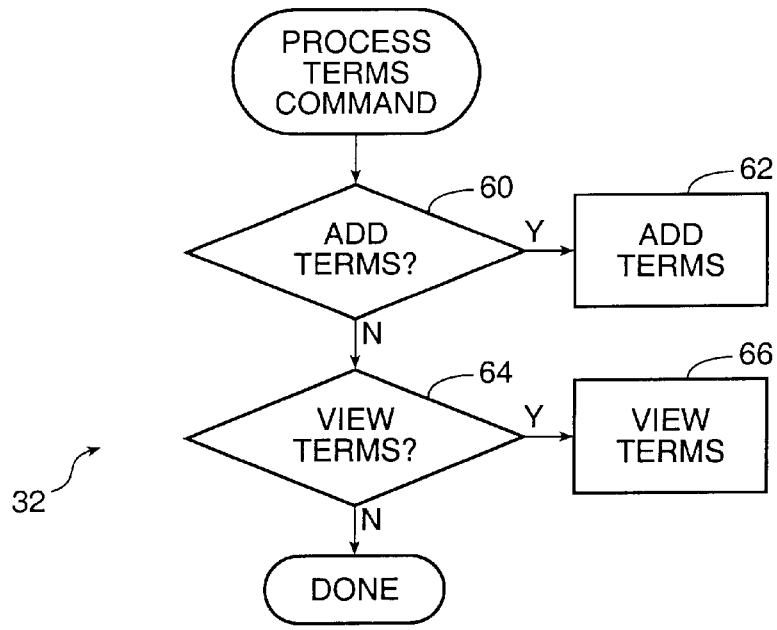
FIG. 4 is a flow diagram of the process terms command procedure shown in the main program loop of FIG. 2 according to one embodiment of the present invention.

Referring now to FIG. 4, a flow diagram of the process terms command procedure 32 shown in FIG. 2 according to one embodiment of the present invention is presented. If the user-selected command is determined at step 60 to be an add terms command, the add terms command is performed at step 62. The "add terms" command allows terms or portions of documents to be added to the category definition of a particular category. According to an embodiment of the present invention, the category must comprise a leaf category. A user can add a term from the initial set of terms, or add additional user-defined terms or document portions to an appropriate category. Multiple terms separated by commas can be entered. A confirmation dialog is presented before a term is added or deleted. Terms of a branch node may be edited if the only type of sub-nodes are "see also" links. This command provides a user with the ability to weight the descriptive terms which define a category. Terms, as well as each hand-classified document portion, can be given different weights. This is performed by creating multiple copies of a selected term or hand-classified document portion within the terms database.

If the user-selected command is not an add terms command, it is next determined if the user-selected command is a view terms command at step 64. If the user-selected command is a view terms command, the view terms command is performed at step 66. The "view terms" command allows a user to view the category definition of a particular category. This command is available only at the root node. This command is used to display all terms according to selection criteria. For example, a user may display the terms entered by anyone or display the terms entered by a user. If the user-selected command is not a view terms command, the process terms command procedure is complete and the program returns to the main loop of FIG. 2. One of ordinary skill in the art will recognize that steps 60–66 may performed in an alternate order.

Method for Classifying a Document within the Class Hierarchy

Once the class hierarchy has been created, documents may be classified within the class hierarchy. According to the embodiments of the present invention, a document is classified based on content within the categories within the class hierarchy. All documents entered into the system are classified within one or more categories. The disclosed method for classification results in correct placement of documents by the classifer approximately 80% of the time.

Figure 5:
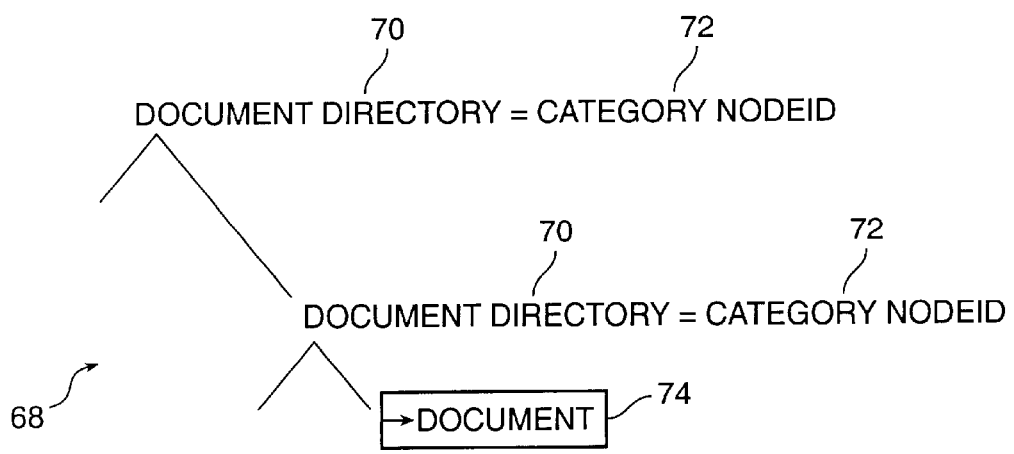
FIG. 5 illustrates a document directory hierarchy according to an embodiment of the present invention.

Referring now to FIG. 5, a document directory hierarchy 68 according to one embodiment of the present invention is shown. The document directory hierarchy 68 comprises a plurality of document directories 70. Each of the directories 70 corresponds to a category within the class hierarchy. According to an embodiment of the present invention, each of the document directories 70 is equivalent to a category NodeID 72 of the corresponding category. Once a document 74 is classified within the class hierarchy, the document 74 is stored within the document directory 68 as shown.

Figure 6:
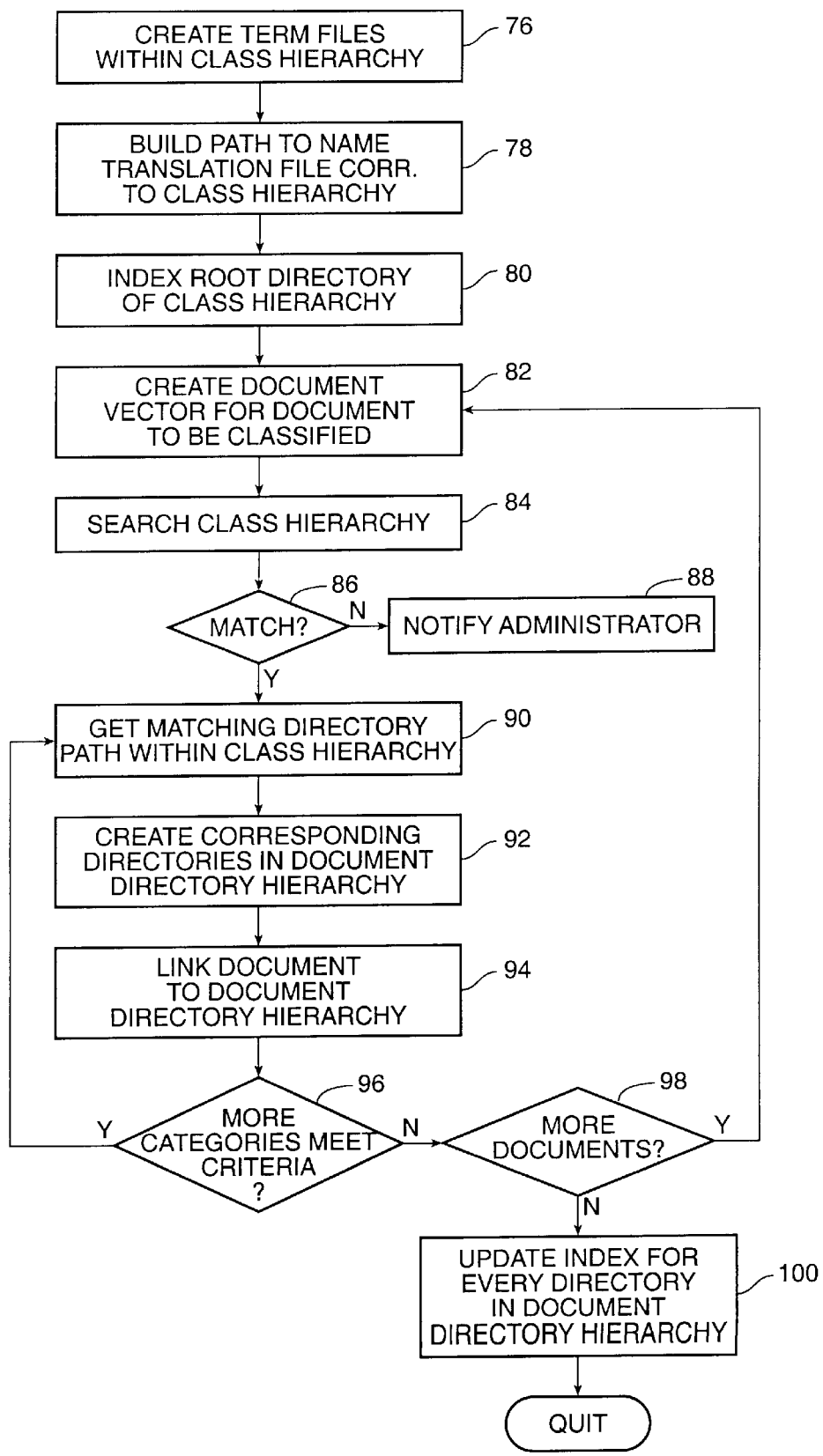
FIG. 6 is a flow diagram of the main procedure utilized in creation of the document directory hierarchy according to one embodiment of the present invention.

Referring now to FIG. 6, a flow diagram of the main procedure utilized in creation of the document directory hierarchy according to one embodiment of the present invention is shown. Initially, at step 76, a terms file is created for each category within the class hierarchy. A category definition for each leaf node is extracted from the terms database and stored in a terms file within the category directory in the class hierarchy. Therefore, each terms file will contain all terms and portions of documents defining the particular category.

Next, at step 78, a path-to-name listing containing a directory path to category name translation for each directory within the class hierarchy is created and stored in a translation file. The categories are extracted from the class hierarchy database by traversing the class hierarchy from the root, finding all the children successively until a leaf node is hit. This process is repeated for all children. Each directory within the directory hierarchy comprises a directory name equivalent to the NodeID of the corresponding category.

Next, at step 80, indexing via Fulcrum is performed. Since each leaf node initially contains only performs the one term document (herein after called a "term file") indexing initially is performed on the terms files. Fulcrum extracts the terms from each term file and weighs each term according to frequency of occurrence. Traversing subdirectories is standard for the Fulcrum search engine. Fulcrum is used to index the 0 node, or root directory, which results in indexing of each subdirectory within the 0 node, creating a zero node index. Then, for each term within all term files, Fulcrum creates a term vector for each of the most common terms of the document, and corresponding positioning information. Indexing creates an index file which contains all term vectors.

Next, a document vector is created at step 82 for a document to be classified. The document vector is created via Fulcrum to allow classification through comparison with document vectors created in step 80.

Next, at step 84, a text search is performed within the class hierarchy to classify a document. The document to be classified is compared against all leaf node data to determine the appropriate category placement for the document. This s performed by comparing document vectors to the term vectors. The document vector created in step 82 is compared via Fulcrum to the term vectors created during the indexing step 80 to determine appropriate category placement. As a result, Fulcrum returns a relevance ranking. A top percentage of the ranking are utilized to determine appropriate categories for the document. This relevance percentage is configurable within the system. The document matches one or more categories if it meets the user-defined criteria, or configured relevance percentage. A result of the search is a list of matching category names.

At step 86, if the document does not match any of the categories, the system administrator is notified at step 88. If, however, the document meets the user-defined criteria, a matching directory path within the class hierarchy is obtained at step 90 for one of the matching category names utilizing the path-to-name translation file.

Next, any necessary directories corresponding to the matching directory path are created within the document directory hierarchy at step 92. Therefore, the directory structure within the class hierarchy will not necessarily be equivalent to that of the document directory hierarchy. As a result, only directories containing documents will be created within the document directory hierarchy. Alternatively, a directory structure equivalent to that of the class hierarchy may be created in a prior step.

Next, at step 94, the document is added to a leaf directory within the document directory hierarchy corresponding to the matching directory path. According to an embodiment of the present invention, the document is symbolically linked via Unix to the directory corresponding to the matching category.

At step 96, it is determined whether there are more matching directory paths to which the document must be linked. If there are more matching directory paths, a matching directory path for the next matching category is retrieved at step 90, and the loop is repeated.

Once the document has been linked within the document directory hierarchy, more documents may be classified by a user at step 98. When no more categories meet the user-defined criteria, more documents may be classified by a user. When all documents have been classified, each directory within the document directory hierarchy is indexed at step 100. When a branch node is indexed, all documents in sub-nodes of that node are indexed. Thus, only indexes corresponding to modified directories and the parent nodes of the modified directories will be updated. Alternatively, only modified directories and any parent nodes of the modified directories may be indexed. If there are more documents to classify at step 98, a document vector is created at step 82 and the loop is repeated.

Method for Searching the Document Directory Hierarchy

Figure 7:
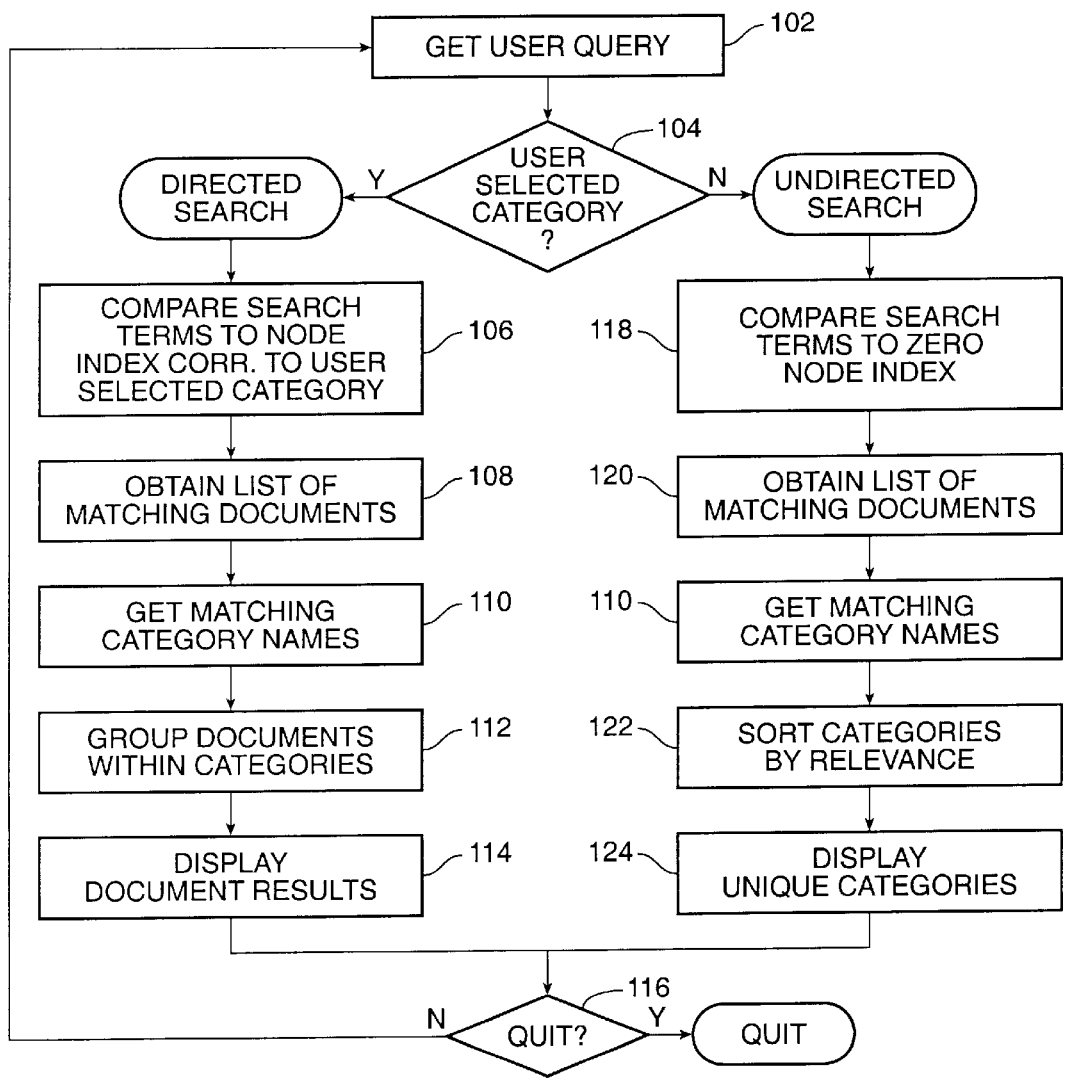
FIG. 7 is a flow diagram illustrating a method for searching the document directory hierarchy according to an embodiment of the present invention.

Referring now to FIG. 7, a flow diagram illustrating a method for searching the document directory hierarchy according to an embodiment of the present invention is shown. According to one embodiment of the present invention, two search methods are provided for searching the document directory hierarchy in response to a user query. According to a first method, an undirected search, a user query may comprise one or more search terms. In addition, after search results are obtained, the user can modify the original search terms to further limit the search. According to a second method, a directed search, a user query may comprise one or more search terms and a selected category to provide a more limited search. Once results are obtained, the user can then select one or more categories or modify the search terms to run a more limited search. According to an embodiment of the present invention, the user specifies a number of documents desired.

At step 102, a user query is obtained. The user query comprises a number of documents desired and one or more search terms. In addition, the user query may include a user selected category.

Next, at step 104, if the user query includes a user selected category, a directed search is performed. At step 106, the search terms are compared to each of the relevant document vectors created by the document indexing of the document directory hierarchy. Since the search is directed, the relevant document vectors are the document vectors within the index corresponding to the desired category.

At step 108, a list of document directory paths is obtained through Fulcrum. Each of the document directory paths includes a matching document name and a directory path corresponding to a matching document. The relevant documents are ranked according to relevance using a statistical ranking provided by Fulcrum. According to one embodiment of the present invention, the user-specified number of document directory paths which are most relevant are selected. Then, matching category names are obtained at step 110.

According to the directed search, the documents are grouped within the matching category names at step 112. Next, information corresponding to each document is displayed by category at step 114. According to an embodiment of the present invention, the document information includes a synopsis and document link. Upon completion of the directed search, a user may choose to quit at step 116. If the user does not choose to quit, the user enters another user query at step 102 and the loop is repeated.

If at step 104, if the user query does not include a user selected category, an undirected search is performed. At step 118, the search terms are compared to each of the relevant document vectors created by the document indexing of the document directory hierarchy. Since the search is undirected, the relevant document vectors are the document vectors within the zero node index.

At step 120, a list of document directory paths is obtained through Fulcrum. Each of the document directory paths includes a matching document name and a directory path corresponding to a matching document. The relevant documents are ranked according to relevance using a statistical ranking provided by Fulcrum. Then, matching category names are obtained at step 110.

According to the undirected search, all relevant category names obtained in step 110 are sorted by relevance at step 122. Duplicate category names are removed from each of the sorted relevant category names, and the unique sorted relevant category names are displayed at step 124. Upon completion of the undirected search, a user may choose to quit at step 116. If the user does not choose to quit, the user enters another user query at step 102 and the loop is repeated. Therefore, the user may select appropriate categories, alter the search terms, and re-run the search.

Figure 8:
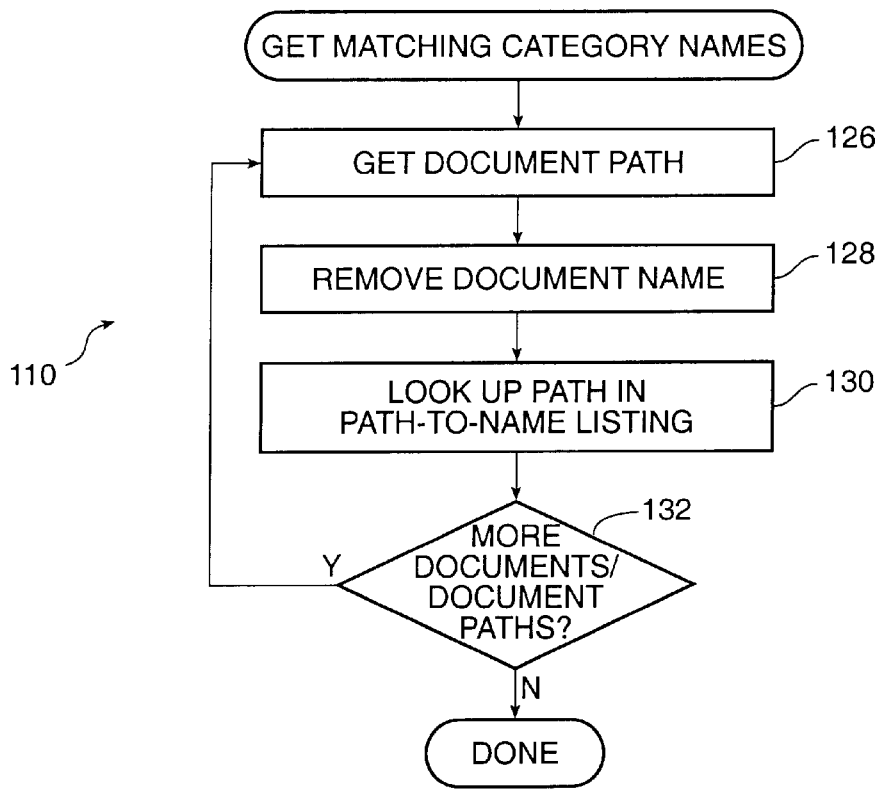
FIG. 8 illustrates a method for retrieving matching category names corresponding to directory paths shown in FIG. 7 according to one embodiment of the present invention.

Referring now to FIG. 8, the method for retrieving matching category names 110 corresponding to directory paths shown in FIG. 7 according to one embodiment of the present invention is presented. At step 126, a matching document directory path is obtained from the matching document directory paths. Next, at step 128, a document name is removed from the document directory path to obtain a directory path. Next, at step 130, a corresponding category name is obtained by performing a search, or look up, for the directory path in the path-to-name listing to obtain a category name. At step 132, if there are more matching document paths, the loop is repeated at step 126. However, if none of the matching document paths remain, each of the matching category names have been retrieved.

Figure 9:
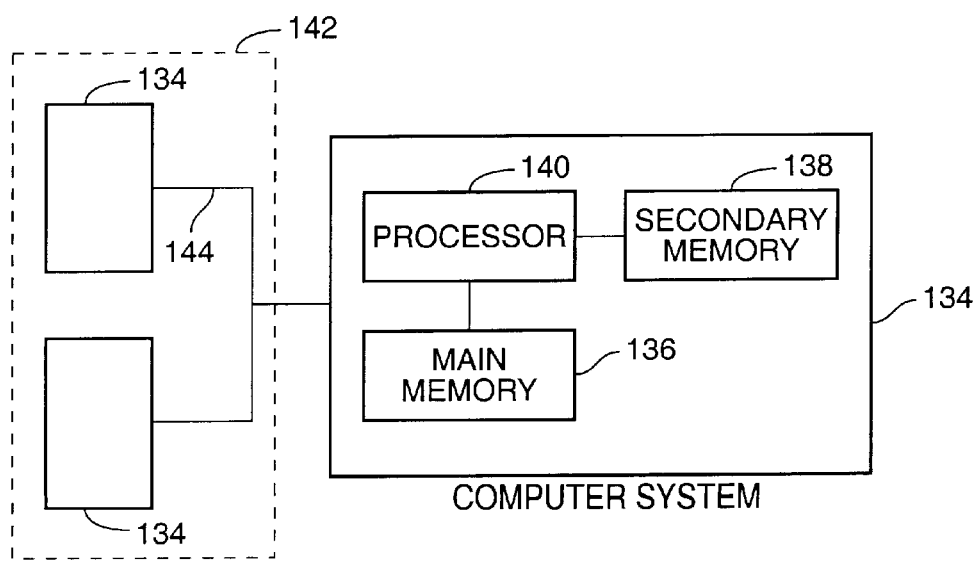
FIG. 9 illustrates a block diagram of an embodiment of a computer system implementing the present invention.

Referring now to FIG. 9, a block diagram of an embodiment of a computer system 134 implementing the present invention is shown. According to this embodiment, the present invention is stored in a main memory 136 or a secondary memory 138 of the computer system 134 for use by a processor 140. The computer system 134 may be connected to a computer network 142 through transmission lines 144. Those of ordinary skill in the art will readily recognize that the present invention may also be used in a standalone computer system, which is by definition not part of a computer network.

Alternative Embodiments

According to an alternative embodiment, the search may be performed on the index created from the terms files within the class hierarchy rather than the index created from the documents in the document directory hierarchy.

Although this method is more efficient than other embodiments, it allows a category which contains no documents to be displayed to the user. Since the user may select a category which contains no documents, this may be confusing to the user.

According to another alternative embodiment, the search may be performed on the index created from the terms files within the class hierarchy in addition to the index created from the documents. This would be helpful to find related categories of information.

Although illustrative embodiments and applications of this invention are shown and described herein, many variations and modifications are possible which remain within the concept, scope, and spirit of the invention, and these variations would become clear to those of skill in the art after perusal of this application. The invention, therefore, is not to be limited except in the spirit of the appended claims in light of their full scope of equivalents.

What is claimed is:

1. A method for classifying a document based on content within a class hierarchy, the method comprising:

initializing the class hierarchy, the class hierarchy having a root category node within a tree data structure, the root category node having a user-defined category name;

displaying the class hierarchy;

accepting a user-selected command for manipulating the class hierarchy;

processing a category command in response to the user-selected command having a first predefined state, causing the class hierarchy to contain a plurality of category nodes, said processing the category command further comprising:

storing a category name in one of the plurality of category nodes, wherein each of the plurality of category nodes corresponds to a unique directory;

storing a NodeID within one of the plurality of category nodes, the NodeID defining the unique directory;

storing a nodetype within one of the plurality of category nodes, the nodetype when having a predefined type allowing a new category node to be added to a selected one of the plurality of category nodes, and otherwise preventing the new category node from being added to the selected one of the plurality of category nodes;

storing a ParentID within one of the plurality of category nodes, the ParentID indicating a NodeID of a parent category node;

storing a LinkID within a first one of the plurality of category nodes, the LinkID indicating a NodeID of a second one of the plurality of category nodes when the nodetype is of a predefined type;

creating a class hierarchy by providing a plurality of category nodes stored in a tree data structure within a memory, each of said plurality of category nodes having a category name corresponding to a unique directory and a set of defining terms;

creating a plurality of terms files, each of said plurality of terms files corresponding to one of said plurality of category nodes and including a corresponding set of defining terms and one or more document fragments stored under said one of said plurality of category nodes, said set of defining terms including a term corresponding to one of said plurality of category nodes and said one or more document fragments including a reference to one or more documents and indexing information indicating contiguous multi-term portions of said documents to be extracted during indexing, said set of defining terms and said document fragments together providing a definition of files to be contained in said unique directory referenced by said one of said plurality of category nodes;

creating one or more term vectors for each of said terms files, each of said term vectors containing a weight assigned to each of one or more common terms of the corresponding terms file according to frequency of occurrence in the corresponding terms file;

creating a document vector for the document, said document vector containing a weight assigned to the terms of the document according to frequency of occurrence;

providing a relevance ranking between said terms files and said document by comparing said document vector with said one or more term vectors; and storing said document within said document directory hierarchy at a location corresponding to a category node having a term vector which has a relevance ranking that matches a selected criteria.

2. The method of claim 1, further including a step of building a path-to-name translation listing containing a directory path and category name for at least one of the plurality of category nodes.

3. The method of claim 1, wherein the step of storing further includes a step of defining the location according to a directory path within a path-to-name translation listing which corresponds to the category node having a term vector which has a relevance ranking that matches a selected criteria.

4. The method of claim 1, wherein the step of providing at least one relevance ranking includes using the Fulcrum™ indexing application.

5. The method of claim 1, wherein each of said contiguous multi-term portions is one sentence or longer.

6. The method of claim 1, wherein each of said contiguous multi-term portions is one paragraph or longer.

7. The method of claim 1, wherein each of said contiguous multi-term portions is 25 words or longer.

8. A method for classifying a document based on content within a class hierarchy, the class hierarchy comprising a plurality of category nodes stored in a tree data structure within a memory, each of the plurality of category nodes having a category name corresponding to a unique directory and a set of defining terms, the method comprising:

initializing the class hierarchy, the class hierarchy having a root category node within a tree data structure, the root category node having a user-defined category name;

displaying the class hierarchy;

accepting a user-selected command for manipulating the class hierarchy;

processing a category command in response to the user-selected command having a first predefined state, causing the class hierarchy to contain a plurality of category nodes, said processing the category command further comprising:

storing a category name in one of the plurality of category nodes, wherein each of the plurality of category nodes corresponds to a unique directory;

storing a NodeID within one of the plurality of category nodes, the NodeID defining the unique directory;

storing a nodetype within one of the plurality of category nodes, the nodetype when having a predefined type allowing a new category node to be added to a selected one of the plurality of category nodes, and otherwise preventing the new category node from being added to the selected one of the plurality of category nodes;

storing a ParentID within one of the plurality of category nodes, the ParentID indicating a NodeID of a parent category node;

storing a LinkID within a first one of the plurality of category nodes, the LinkID indicating a NodeID of a second one of the plurality of category nodes when the nodetype is of a predefined type;

creating a plurality of terms files, each of the plurality of terms files corresponding to one of the plurality of category nodes and including a corresponding set of defining terms and one or more document fragments stored under said one of said plurality of category nodes, said set of defining terms including a term corresponding to one of said plurality of category nodes and said one or more document fragments including a reference to one or more documents and indexing information indicating contiguous multi-term portions of said documents to be extracted during indexing, said set of defining terms and said document fragments together providing a definition of files to be contained in said unique directory referenced by said one of said plurality of category nodes;

building a path-to-name translation listing containing each category name and unique directory pair for each of the plurality of category nodes;

indexing the class hierarchy using Fulcrum to create an index file containing term vectors corresponding to the plurality of terms files;

classifying at least one document within a document directory hierarchy using said term vectors; and indexing the document directory hierarchy using Fulcrum.

9. The method according to claim 8, wherein the step of creating is performed for each one of the plurality of category nodes defined as a lead node.

10. The method according to claim 8, the step of creating further comprising the following steps:

retrieving a set of defining terms for one of the plurality of category nodes;

forming a terms file within the unique directory in the class hierarchy corresponding to the one of the plurality of category nodes; and storing the set of defining terms within the terms file.

11. The method according to claim 8, the step of classifying further comprising the following steps:

creating a document vector for a document to be classified within the class hierarchy;

searching the class hierarchy for the term vectors which are relevant to the document to determine appropriate categorization of the document, the step of searching if successful returning a list of matching category names, and otherwise notifying a system administrator that the step of searching was unsuccessful; and storing the document in directories corresponding to the matching category names if the step of searching is successful.

12. The method according to claim 11, wherein the step of searching comprises:

comparing the document vector to the term vectors using Fulcrum, the step of comparing returning a list of matching categories within the class hierarchy according to user-defined criteria, the list of matching categories corresponding to the at least one of the plurality of category nodes.

13. The method according to claim 11, the step of storing further comprising the following steps:

retrieving a directory path corresponding to one of the matching category names utilizing the path-to-name translation listing;

creating directories within the document directory hierarchy corresponding to the directory path if not already existing within the document directory hierarchy; and adding the document to a leaf directory within the document directory hierarchy corresponding to the retrieved directory path.

14. The method according to claim 13, wherein the step of adding comprises linking the document to the directory.

15. The method according to claim 11, the step of storing further comprising the following steps:

creating a directory within the document directory hierarchy corresponding to each of the unique directories within the class hierarchy;

retrieving a directory path corresponding to one of the matching category names utilizing the path-to-name translation listing; and adding the document to a directory within the document directory hierarchy corresponding to the retrieved directory path.

16. The method according to claim 15, wherein the step of adding comprises linking the document to the directory.

17. The method of claim 8, wherein each of said contiguous multi-term portions is one sentence or longer.

18. The method of claim 8, wherein each of said contiguous multi-term portions is one paragraph or longer.

19. The method of claim 8, wherein each of said contiguous multi-term portions is 25 words or longer.

20. A computer system for classifying a document comprising:

a processor; and a memory having stored therein the following:

means for initializing the class hierarchy, the class hierarchy having a root category node within a tree data structure, the root category node having a user-defined category name;

means for displaying the class hierarchy;

accepting a user-selected command for manipulating the class hierarchy;

means for processing a category command in response to the user-selected command having a first predefined state, causing the class hierarchy to contain a plurality of category nodes, said processing means further comprising:

means for storing a category name in one of the plurality of category nodes, wherein each of the plurality of category nodes corresponds to a unique directory;

means for storing a NodeID within one of the plurality of category nodes, the NodeID defining the unique directory;

means for storing a nodetype within one of the plurality of category nodes, the nodetype when having a predefined type allowing a new category node to be added to a selected one of the plurality of category nodes, and otherwise preventing the new category node from being added to the selected one of the plurality of category nodes;

means for storing a ParentID within one of the plurality of category nodes, the ParentID indicating a NodeID of a parent category node;

means for storing a LinkID within a first one of the plurality of category nodes, the LinkID indicating a NodeID of a second one of the plurality of category nodes when the nodetype is of a predefined type;

means for creating a class hierarchy having a plurality of category nodes stored in a tree data structure within a memory, each of the plurality of category nodes having a category name corresponding to a unique directory and a set of defining terms;

means for creating a plurality of terms files, each of the plurality of terms files corresponding to one of the plurality of category nodes and including a corresponding set of defining terms and one or more document fragments stored under said one of said plurality of category nodes, said set of defining terms including a term corresponding to one of said plurality of category nodes and said one or more document fragments including a reference to one or more documents and indexing information indicating contiguous multi-term portions of said documents to be extracted during indexing, said set of defining terms and said document fragments together providing a definition of files to be contained in said unique directory referenced by said one of said plurality of category nodes;

means for creating one or more term vectors for each of said terms files, each of said term vectors containing a weight assigned to each of one or more common terms of the corresponding terms file according to frequency of occurrence in the corresponding terms file;

means for building a path-to-name translation listing containing a directory path and category name for each of the plurality of category nodes;

an indexing means for providing a relevance ranking between the terms files and the document by comparing the document vector with the at least one term vector; and means for storing the document within the document directory hierarchy at a location corresponding to a category node having a term vector which has a relevance ranking that matches a selected criteria.

21. The computer system of claim 20, further including means for building a path-to-name translation listing containing a directory path and category name for at least one of the plurality of category nodes.

22. The computer system of claim 20, wherein the means for storing further includes means for defining the location according to a directory path within a path-to-name translation listing which corresponds to the category node having a term file which has a relevance ranking that matches a selected criteria.

23. The computer system of claim 20, wherein each of said contiguous multi-term portions is one sentence or longer.

24. The computer system of claim 20, wherein each of said contiguous multi-term portions is one paragraph or longer.

25. The computer system of claim 20, wherein each of said contiguous multi-term portions is 25 words or longer.

26. A computer system for classifying a document based on content within a class hierarchy, the class hierarchy comprising a plurality of category nodes stored in a tree data structure within a memory, each of the plurality of category nodes having a category name corresponding to a unique directory and a set of defining terms, the computer system comprising:

a processor; and a memory having stored therein the following:
means for initializing the class hierarchy, the class hierarchy having a root category node within a tree data structure, the root category node having a user-defined category name;

means for displaying the class hierarchy;

means for accepting a user-selected command for manipulating the class hierarchy;

means for processing a category command in response to the user-selected command having a first predefined state, causing the class hierarchy to contain a plurality of category nodes, said processing means further comprising:

means for storing a category name in one of the plurality of category nodes, wherein each of the plurality of category nodes corresponds to a unique directory;

means for storing a NodeID within one of the plurality of category nodes, the NodeID defining the unique directory;

means for storing a nodetype within one of the plurality of category nodes, the nodetype when having a predefined type allowing a new category node to be added to a selected one of the plurality of category nodes, and otherwise preventing the new category node from being added to the selected one of the plurality of category nodes;

means for storing a ParentID within one of the plurality of category nodes, the ParentID indicating a NodeID of a parent category node;

means for storing a LinkID within a first one of the plurality of category nodes, the LinkID indicating a NodeID of a second one of the plurality of category nodes when the nodetype is of a predefined type;

means for creating a plurality of terms files, each of the plurality of terms files corresponding to one of the plurality of category nodes and including a corresponding set of defining terms and one or more document fragments stored under said one of said plurality of category nodes, said set of defining terms including a term corresponding to one of said plurality of category nodes and said one or more document fragments including a reference to one or more documents and indexing information indicating contiguous multi-term portions of said documents to be extracted during indexing, said set of defining terms and said document fragments together providing a definition of files to be contained in said unique directory referenced by said one of said plurality of category nodes;

means for making one or more term vectors for each of said terms files, each of said term vectors containing a weight assigned to each of one or more common terms of the corresponding terms file according to the frequency of occurrence in the corresponding terms file;

means for making a document vector for the document, said document vector containing a weight assigned to the terms of the document according to frequency of occurrence, means for building a path-to-name translation listing containing each category name and unique directory pair for each of the plurality of category nodes;

means for indexing the class hierarchy using Fulcrum to create an index file containing term file vectors corresponding to the plurality of terms files;

means for classifying at least one document within a document directory hierarchy using the term file vectors; and means for indexing the document directory hierarchy using Fulcrum.

27. The computer system according to claim 26, wherein the means for creating is performed for each one of the plurality of category nodes being a leaf node.

28. The computer system of claim 27, wherein each of said contiguous multi-term portions is 25 words or longer.

29. The computer system according to claim 26, the means for creating further comprising:

means for retrieving a set of defining terms for one of the plurality of category nodes;

means for forming a terms file within the unique directory in the class hierarchy corresponding to the one of the plurality of category nodes; and means for storing the set of defining terms within the terms file.

30. The computer system according to claim 26, the means for classifying further comprising:

means for creating a document vector for a document to be classified within the class hierarchy;

means for searching the class hierarchy for the terms file vectors which are relevant to the document to determine appropriate categorization of the document, the step of searching if successful returning a list of matching category names, and otherwise notifying a system administrator that the step of searching was unsuccessful; and means for storing the document in directories corresponding to the matching category names if the step of searching is successful.

31. The computer system according to claim 30, wherein the means for searching comprises:

means for comparing the document vector to the term vectors using Fulcrum, the step of comparing returning a list of matching categories within the class hierarchy according to the user-defined criteria, the list of matching categories corresponding to the at least one of the plurality of category nodes.

32. The computer system according to claim 30, the means for storing further comprising:

means for retrieving a directory path corresponding to one of the matching category names utilizing the path-to-name translation listing;

means for creating directories within the document directory hierarchy corresponding to the directory path if not already existing within the document directory hierarchy; and means for adding the document to a leaf directory within the document directory hierarchy corresponding to the retrieved directory path.

33. The computer system according to claim 32, wherein the means for adding comprises linking the document to the directory.

34. The computer system according to claim 30, the means for storing further comprising:

means for creating a directory within the document directory hierarchy corresponding to each of the unique directories within the class hierarchy;

means for retrieving a directory path corresponding to one of the matching category names utilizing the path-to-name translation listing; and means for adding the document to a directory within the document directory hierarchy corresponding to the retrieved directory path.

35. The computer system according to claim 34, wherein the means for adding comprises linking the document to the directory.

36. The computer system of claim 26, wherein each of said contiguous multi-term portions is one sentence or longer.

37. The computer system of claim 26, wherein each of said contiguous multi-term portions is one paragraph or longer.

38. An article of manufacture, comprising:

a computer usable medium having a computer readable program code means embodied therein for classifying a document based on content within a class hierarchy, the computer readable program code means in the article of manufacture comprising:

computer-readable program means for initializing the class hierarchy, the class hierarchy having a root category node within a tree data structure, the root category node having a user-defined category name;

computer-readable program means for displaying the class hierarchy;

computer-readable program means for accepting a user-selected command for manipulating the class hierarchy;

computer-readable program means for processing a category command in response to the user-selected command having a first predefined state, causing the class hierarchy to contain a plurality of category nodes, said processing the category command further comprising:

computer-readable program means for storing a category name in one of the plurality of category nodes, wherein each of the plurality of category nodes corresponds to a unique directory;

computer-readable program means for storing a NodeID within one of the plurality of category nodes, the NodeID defining the unique directory;

computer-readable program means for storing a nodetype within one of the plurality of category nodes, the nodetype when having a predefined type allowing a new category node to be added to a selected one of the plurality of category nodes, and otherwise preventing the new category node from being added to the selected one of the plurality of category nodes;

computer-readable program means for storing a ParentID within one of the plurality of category nodes, the ParentID indicating a NodeID of a parent category node;

computer-readable program means for storing a LinkID within a first one of the plurality of category nodes, the LinkID indicating a NodeID of a second one of the plurality of category nodes when the nodetype is of a predefined type; computer-readable program means for creating the class hierarchy by providing a plurality of category nodes stored in a tree data structure within a memory, each of the plurality of category nodes having a category name corresponding to a unique directory and a set of defining terms and one or more document fragments stored under said one of said plurality of category nodes, said set of defining terms including a term corresponding to one of said plurality of category nodes and said one or more document fragments including a reference to one or more documents and indexing information indicating contiguous multi-term portions of said documents to be extracted during indexing, said set of defining terms and said document fragments together providing a definition of files to be contained in said unique directory referenced by said one of said plurality of category nodes;

computer-readable program means for creating a plurality of terms files, each of the plurality of terms files corresponding to one of the plurality of category nodes and including a corresponding set of defining terms;

computer readable program means for making one or more term vectors for each of said terms files, each of said term vectors containing a weight assigned to each of one or more common terms of the corresponding terms file according to frequency of occurrence in the corresponding terms file;

computer readable program means for creating a document vector for the document, said document vector containing a weight assigned to the terms of the document according to frequency of occurrence, computer-readable program means for providing a relevance ranking between the terms files and the document by comparing the document vector with said one or more term vectors; and computer-readable program means for storing the document within the document directory hierarchy at a location corresponding to a category node having a term vector which has a relevance ranking that matches a selected criteria.

39. The computer program product of claim 38, further including computer-readable program means for building a path-to-name translation listing containing a directory path and category name for at least one of the plurality of category nodes.

40. The computer program product of claim 38, wherein computer-readable program means for providing a relevance ranking includes:
   computer-readable program means for creating at least one term file vector by indexing at least one of the plurality of terms files within the class hierarchy; and
   computer-readable program means for creating a document vector by indexing a document which is selected for classification within a document directory hierarchy.

41. The computer program product of claim 38, wherein the computer-readable program means for storing further includes computer-readable program means for defining the location according to a directory path within a path-to-name translation listing which corresponds to the category node having a term vector which has a relevance ranking that matches a selected criteria.

42. The article of manufacture of claim 38, wherein each of said contiguous multi-term portions is one sentence or longer.

43. The article of manufacture of claim 38, wherein each of said contiguous multi-term portions is one paragraph or longer.

44. The article of manufacture of claim 38, wherein each of said contiguous multi-term portions is 25 words or longer.

45. A computer-readable medium recording software, the software disposed on a computer to perform a method for classifying a document based on content within a class hierarchy, the class hierarchy comprising a plurality of category nodes stored in a tree data structure within a memory, each of the plurality of category nodes having a category name corresponding to a unique directory and a set of defining terms, the method comprising:

initializing the class hierarchy, the class hierarchy having a root category node within a tree data structure, the root category node having a user-defined category name;

displaying the class hierarchy;

accepting a user-selected command for manipulating the class hierarchy;

processing a category command in response to the user-selected command having a first predefined state, causing the class hierarchy to contain a plurality of category nodes, said processing the category command further comprising:

storing a category name in one of the plurality of category nodes, wherein each of the plurality of category nodes corresponds to a unique directory;

storing a NodeID within one of the plurality of category nodes, the NodeID defining the unique directory;

storing a nodetype within one of the plurality of category nodes, the nodetype when having a predefined type allowing a new category node to be added to a selected one of the plurality of category nodes, and otherwise preventing the new category node from being added to the selected one of the plurality of category nodes;

storing a ParentID within one of the plurality of category nodes, the ParentID indicating a NodeID of a parent category node;

storing a LinkID within a first one of the plurality of category nodes, the LinkID indicating a NodeID of a second one of the plurality of category nodes when the nodetype is of a predefined type;

creating a plurality of terms files, each of the plurality of terms files corresponding to one of the plurality of category nodes and including a corresponding set of defining terms and one or more document fragments stored under said one of said plurality of category nodes, said set of defining terms including a term corresponding to one of said plurality of category nodes and said one or more document fragments including a reference to one or more documents and indexing information indicating contiguous multi-term portions of said documents to be extracted during indexing, said set of defining terms and said document fragments together providing a definition of files to be contained in said unique directory referenced by said one of said plurality of category nodes;

making one or more term vectors for each of said terms files, each of said term vectors containing a weight assigned to each of one or more common terms of the corresponding terms file according to frequency of occurrence in the corresponding terms file;

building a path-to-name translation listing containing each category name and unique directory pair for each of the plurality of category nodes;

indexing the class hierarchy using Fulcrum to create an index file containing term file vectors corresponding to the plurality of terms files;

classifying at least one document within a document directory hierarchy using terms vectors; and indexing the document directory hierarchy using Fulcrum.

46. The computer-readable medium according to claim 45, wherein the step of creating is performed for each one of the plurality of category nodes being a leaf node.

47. The computer-readable medium according to claim 45, the step of creating further comprising the following steps:

retrieving a set of defining terms for one of the plurality of category nodes;

forming a terms file within the unique directory in the class hierarchy corresponding to the one of the plurality of category nodes; and storing the set of defining terms within the terms file.

48. The computer-readable medium according to claim 45, the step of classifying further comprising the following steps:

creating a document vector for a document to be classified within the class hierarchy;

searching the class hierarchy for the terms vectors which are relevant to the document to determine appropriate categorization of the document, the step of searching if successful returning a list of matching category names, and otherwise notifying a system administrator that the step of searching was unsuccessful; and storing the document in directories corresponding to the matching category names if the step of searching is successful.

49. The computer readable medium according to claim 48, wherein the step of searching comprises:

comparing the document vector to the term vectors using Fulcrum, the step of comparing returning a list of matching categories within the class hierarchy according to user-defined criteria, the list of matching categories corresponding to the at least one of the plurality of category nodes.

50. The computer-readable medium according to claim 48, the step of storing further comprising the following steps:

retrieving a directory path corresponding to one of the matching category names utilizing the path-to-name translation listing;

creating directories within the document directory hierarchy corresponding to the directory path if not already existing within the document directory hierarchy; and adding the document to a leaf directory within the document directory hierarchy corresponding to the retrieved directory path.

51. The computer-readable medium according to claim 50, wherein the step of adding comprises linking the document to the directory.

52. The computer-readable medium according to claim 48, the step of storing further comprising the following steps:

creating a directory within the document directory hierarchy corresponding to each of the unique directories within the class hierarchy;

retrieving a directory path corresponding to one of the matching category names utilizing the path-to-name translation listing; and adding the document to a directory within the document directory hierarchy corresponding to the retrieved directory path.

53. The computer-readable medium according to claim 52, wherein the step of adding comprises linking the document to the directory.

54. The computer-readable medium recording software of claim 45, wherein each of said contiguous multi-term portions is one sentence or longer.

55. The computer-readable medium recording software of claim 45, wherein each of said contiguous multi-term portions is one paragraph or longer.

56. The computer-readable medium recording software of claim 45, wherein each of said contiguous multi-term portions is 48 words or longer.

57. A computer data signal embodied in a carrier wave and representing sequences of instructions which, when executed by a processor, cause said processor to classify a document based on content within a class hierarchy, by performing the following steps:

initializing the class hierarchy, the class hierarchy having a root category node within a tree data structure, the root category node having a user-defined category name;

displaying the class hierarchy;

accepting a user-selected command for manipulating the class hierarchy;

processing a category command in response to the user-selected command having a first predefined state, causing the class hierarchy to contain a plurality of category nodes, said processing the category command further comprising:

storing a category name in one of the plurality of category nodes, wherein each of the plurality of category nodes corresponds to a unique directory;

storing a NodeID within one of the plurality of category nodes, the NodeID defining the unique directory;

storing a nodetype within one of the plurality of category nodes, the nodetype when having a predefined type allowing a new category node to be added to a selected one of the plurality of category nodes, and otherwise preventing the new category node from being added to the selected one of the plurality of category nodes;

storing a ParentID within one of the plurality of category nodes, the ParentID indicating a NodeID of a parent category node;

storing a LinkID within a first one of the plurality of category nodes, the LinkID indicating a NodeID of a second one of the plurality of category nodes when the nodetype is of a predefined type;

creating the class hierarchy by providing a plurality of category nodes stored in a tree data structure within a memory, each of the plurality of category nodes having a category name corresponding to a unique directory and a set of defining terms and one or more document fragments stored under said one of said plurality of category nodes, said set of defining terms including a term corresponding to one of said plurality of category nodes and said one or more document fragments including a reference to one or more documents and indexing information indicating contiguous multi-term portions of said documents to be extracted during indexing, said set of defining terms and said document fragments together providing a definition of files to be contained in said unique directory referenced by said one of said plurality of category nodes;

creating a plurality of terms files, each of the plurality of terms files corresponding to one of the plurality of category nodes and including a corresponding set of defining terms;

making one or more term vectors for each of said terms files, each of said term vectors containing a weight assigned to each of one or more common terms of the corresponding terms files according to frequency of occurrence in the corresponding terms file;

providing a relevance ranking between the term vectors and the document by comparing said document vector with the at least one term vector; and storing the document within the document directory hierarchy at a location corresponding to a category node having a term vector which has a relevance ranking that matches a selected criteria.

58. The computer data signal of claim 57, further including computer-readable program means for building a pathto-name translation listing containing a directory path and category name for at least one of the plurality of category nodes.

59. The computer data signal of claim 57, wherein the computer-readable program means for providing a relevance ranking includes:
   computer-readable program means for creating at least one term file vector by indexing at least one of the plurality of terms files within the class hierarchy; and
   computer-readable program means for creating a document vector by indexing a document which is selected for classification within a document directory hierarchy.

60. The computer data signal of claim 57, wherein the step of storing further includes a step of defining the location according to a directory path within a path-to-name translation listing which corresponds to the category node having a term vector which has a relevance ranking that matches a selected criteria.

61. The computer data signal of claim 57, wherein each of said contiguous multi-term portions is one sentence or longer.

62. The computer data signal of claim 57, wherein each of said contiguous multi-term portions is one paragraph or longer.

63. The computer data signal of claim 57, wherein each of said contiguous multi-term portions is 25 words or longer.

64. A computer data signal embodied in a carrier wave comprising:
   means for initializing the class hierarchy, the class hierarchy having a root category node within a tree data structure, the root category node having a user-defined category name;
   means for displaying the class hierarchy;
   means for accepting a user-selected command for manipulating the class hierarchy;
   means for processing a category command in response to the user-selected command having a first predefined state, causing the class hierarchy to contain a plurality of category nodes, said processing means further comprising:
      means for storing a category name in one of the plurality of category nodes, wherein each of the plurality of category nodes corresponds to a unique directory;
      means for storing a NodeID within one of the plurality of category nodes, the NodeID defining the unique directory;
      means for storing a nodetype within one of the plurality of category nodes, the nodetype when having a predefined type allowing a new category node to be added to a selected one of the plurality of category nodes, and otherwise preventing the new category node from being added to the selected one of the plurality of category nodes;
      means for storing a ParentID within one of the plurality of category nodes, the ParentID indicating a NodeID of a parent category node;
      means for storing a LinkID within a first one of the plurality of category nodes, the LinkID indicating a NodeID of a second one of the plurality of category nodes when the nodetype is of a predefined type;
   means for creating a class hierarchy by providing a plurality of category nodes in a tree data structure within a memory, each of the plurality of category nodes having a category name corresponding to a unique directory and a set of defining terms;
   means for creating a plurality of terms files, each of the plurality of terms files corresponding to one of the plurality of category nodes and including a corresponding set of defining terms and one or more document fragments stored under said one of said plurality of category nodes, said set of defining terms including a term corresponding to one of said plurality of category nodes and said one or more document fragments including a reference to one or more documents and indexing information indicating contiguous multi-term portions of said documents to be extracted during indexing, said set of defining terms and said document fragments together providing a definition of files to be contained in said unique directory referenced by said one of said plurality of category nodes;
   means for creating one or more term vectors for each of said terms files, each of said term vectors containing a weight assigned to each of one or more common terms of the corresponding terms files according to frequency of occurrence in the corresponding terms file;
   means for creating a path-to-name translation listing containing each category name and unique directory pair for each of the plurality of category nodes;
   means for indexing the class hierarchy using Fulcrum to create an index file containing term vectors corresponding to the plurality of term vectors;
   means for classifying at least one document within a document directory hierarchy using the term vectors; and
   means for indexing the document directory hierarchy using Fulcrum.

65. The computer data signal according to claim 64, wherein the step of creating is performed for each one of the plurality of category nodes being a leaf node.

66. The computer data signal according to claim 64, the step of creating further comprising the following steps:
   retrieving a set of defining terms for one of the plurality of category nodes;
   forming a terms file within the unique directory in the class hierarchy corresponding to the one of the plurality of category nodes; and
   storing the set of defining terms within the terms file.

67. The computer data signal according to claim 64, the step of classifying further comprising the following steps:
   creating a document vector for a document to be classified within the class hierarchy;
   searching the class hierarchy for the terms vectors which are relevant to the document to determine appropriate categorization of the document, the step of searching if successful returning a list of matching category names, and otherwise notifying a system administrator that the step of searching was unsuccessful; and
   storing the document in directories corresponding to the matching category names if the step of searching is successful.

68. The computer data signal according to claim 67, wherein the step of searching comprises:
   comparing the document vector to the term vectors using Fulcrum, the step of comparing returning a list of matching categories within the class hierarchy according to user-defined criteria, the list of matching categories corresponding to the at least one of the plurality of category nodes.

69. The computer data signal according to claim 67, the step of storing further comprising the following steps:

retrieving a directory path corresponding to one of the matching category names utilizing the path-to-name translation listing;

creating directories within the document directory hierarchy corresponding to the directory path if not already existing within the document directory hierarchy; and adding the document to a leaf directory within the document directory hierarchy corresponding to the retrieved directory path.

70. The computer data signal according to claim 69, wherein the step of adding comprises linking the document to the directory.

71. The computer data signal according to claim 67, the step of storing further comprising the following steps:

creating a directory within the document directory hierarchy corresponding to each of the unique directories within the class hierarchy;

retrieving a directory path corresponding to one of the matching category names utilizing the path-to-name translation listing; and adding the document to a directory within the document directory hierarchy corresponding to the retrieved directory path.

72. The computer data signal according to claim 71, wherein the step of adding comprises linking the document to the directory.

73. The computer data signal of claim 64, wherein each of said contiguous multi-term portions is one sentence or longer.

74. The computer data signal of claim 64, wherein each of said contiguous multi-term portions is one paragraph or longer.

75. The computer data signal of claim 64, wherein each of said contiguous multi-term portions is 25 words or longer.

* * * * *

UNITED STATES PATENT AND TRADEMARK OFFICE
CERTIFICATE OF CORRECTION

PATENT NO. : 6,185,550 B1
DATED : February 6, 2001
INVENTOR(S) : William A. Snow and Joseph D. Mocker It is certified that error appears in the above-identified patent and that said Letters Patent is hereby corrected as shown below:

Column 1,
Line 6, insert
-- CROSS-REFERENCE TO RELATED APPLICATION
　　　The present invention is related to co-pending application serial no. 08/874,567, entitled "METHOD AND APPARATUS FOR CREATING A CATEGORY HIERARCHY FOR CLASSIFICATION OF DOCUMENTS", filed on June 13, 1997, in the name of William A. Snow and Joseph D. Mocker, and issued on April 25, 2000 as patent no. 6,055,540. --.

Column 3,
Line 12, replace "node type" with -- nodetype --
Line 47, replace "indicated" with -- indicates --.

Column 4,
Line 8, after "may" insert -- be --.
Line 34, replace "indicated" with -- indicates --.

Column 5,
Line 4, after "may" insert -- be --.
Line 55, after "may" insert -- be --.

Column 6,
Line 28, delete "performs".
Line 30, after "performed" insert -- only --.

Column 14,
Line 61, replace "," with -- ; --.

Column 17,
Line 17, replace "," with -- ; --.
Line 26, replace "computer program product" with -- article of manufacture --.
Line 31, replace "computer program product" with -- article of manufacture --.
Line 35, delete "file".
Line 41, replace "computer program product" with -- article of manufacture --.

UNITED STATES PATENT AND TRADEMARK OFFICE
CERTIFICATE OF CORRECTION

PATENT NO. : 6,185,550 B1
DATED : February 6, 2001
INVENTOR(S) : William A. Snow and Joseph D. Mocker It is certified that error appears in the above-identified patent and that said Letters Patent is hereby corrected as shown below:

Column 19,
Line 64, replace "48" with -- 25 --.

Signed and Sealed this

Eighteenth Day of June, 2002

Attest:

JAMES E. ROGAN
Attesting Officer
Director of the United States Patent and Trademark Office